Patented June 7, 1927.

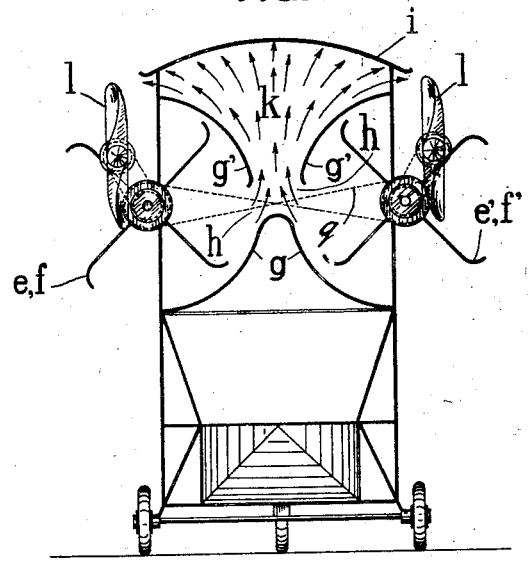
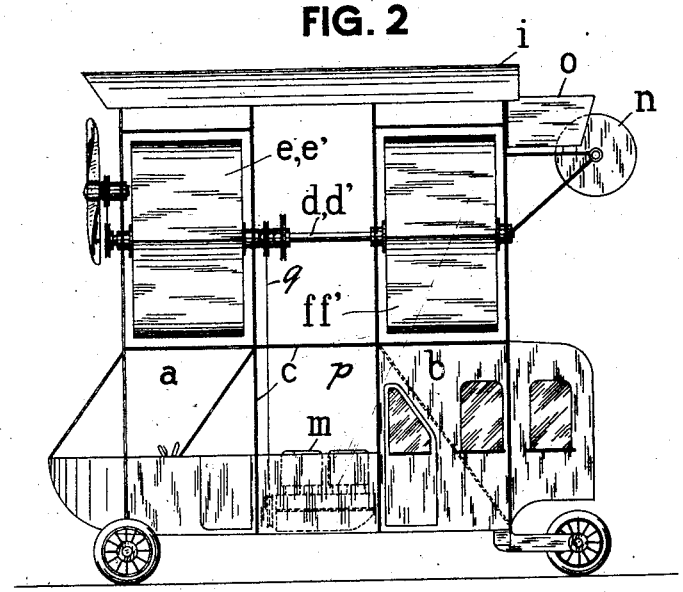

1,631,861

UNITED STATES PATENT OFFICE.

ADELHEID HANSCHKE, NÉE SACHS, OF BERLIN, GERMANY.

FLYING MACHINE.

Application filed September 11, 1926, Serial No. 134,917, and in Germany June 25, 1926.

This invention relates to a flying machine and consists in the provision of a wheeled frame having two symmetrically arranged, horizontal shafts arranged at opposite sides of the frame and at the same level, the shafts being fitted with vaned supporting wheels which move in opposite directions so that the outside halves of the wheels can lift and support the machine by engagement with the air, the inside halves of the wheels being embraced by curved plates which form an air space under a roof covering the frame, the plates being interrupted so that air will be forced by the upwardly moving vanes through said space against the roof. For the forward movement, propellers are provided which are geared to the said shafts so that they can be driven at different speeds and be started and stopped independently of the supporting wheels.

Fig. 1 of the accompanying drawings represents a front view of the machine, and

Fig. 2, a side view of the same.

The machine comprises a wheeled frame $c$ the lower part of which is occupied by the pilot house $a$, an engine room $p$, and a cabin $b$. Above the house $a$ and the cabin $b$, a symmetrical arrangement of vaned wheels $e$, $e'$ and $f$, $f'$ is provided, the wheels being mounted on horizontal, parallel, longitudinal shafts $d$, $d'$ arranged at opposite sides of the frame $c$. The shafts are driven by the engine $m$ through the medium of belts $q$. The outside halves of the wheels move downwards so as to lift and support the machine by the engagement of the vanes with the air. The inside halves of the wheels are embraced by curved plates $q$ and $q'$. The frame $c$ is covered by a roof $i$ under which, between the plates $q'$, an air space $h$ is formed. The continuity of the plates is interrupted at $h$ so that air can be forced by the upwardly moving vanes into the space $h$ and form an air cushion under the roof. The plates $g'$ prevent this air cushion from being dissipated by the vanes. The space $h$ is closed at one end of the machine, preferably at the front, so that the air cushion will not be dissipated by longitudinal draught. The plates $g$ recede from the path of the vanes in the direction of movement so as to facilitate the entrance of the air into the space $h$.

The forward flight is effected by propellers $l$, $l'$ which are preferably geared to the shafts $d$, $d'$, means being, however, provided for driving the propellers at different speeds and also for starting and stopping them independently of the supporting wheels.

The ascent and descent as well as the altitude of the machine generally, are governed by means of the supporting wheels which for this purpose are driven at greater or less speed. The machine is stabilized by means of an automatically adjustable stabilizing plane $n$ and steered by means of a rudder $o$.

I claim:

1. A flying machine comprising a wheeled frame, a roof covering said frame, two longitudinal, horizontal shafts arranged at opposite sides of said frame on the same level, vaned supporting wheels connected to said shafts, curved plates arranged so as to embrace the inside halves of said wheels and form an air space between them under said roof, means for rotating the wheels in opposite directions so that their outside halves will act on the air for upward propulsion, the plates being interrupted so that air will be forced by the upwardly moving vanes into the space under the roof, and propellers mounted in said frame so that they can be used for forward flight.

2. A flying machine according to claim 1 wherein the space under the roof is closed at one end of the machine.

3. A flying machine according to claim 1 wherein the propellers are geared to the shafts of the supporting wheels so that they can be driven at different speeds as well as started and stopped independently of the wheels.

Frau ADELHEID HANSCHKE, geb. SACHS.